United States Patent
Stogiannos et al.

(10) Patent No.: US 11,465,514 B2
(45) Date of Patent: Oct. 11, 2022

(54) ONBOARD POWER SUPPLY SYSTEM

(71) Applicant: Eberspächer Controls Esslingen GmbH & Co. KG, Esslingen (DE)

(72) Inventors: Panagiotis Stogiannos, Stuttgart (DE); Michael Kriessl, Göppingen (DE); Patrick Fritz, Baltmannsweiler (DE)

(73) Assignee: Eberspächer Controls Esslingen GmbH & Co. KG, Esslingen (DE)

( * ) Notice: Subject to any disclaimer, the term of this patent is extended or adjusted under 35 U.S.C. 154(b) by 252 days.

(21) Appl. No.: 16/939,516

(22) Filed: Jul. 27, 2020

(65) Prior Publication Data
US 2021/0031636 A1 Feb. 4, 2021

(30) Foreign Application Priority Data

Jul. 30, 2019 (DE) ...................... 10 2019 120 471.2
Sep. 10, 2019 (DE) ...................... 10 2019 124 163.4

(51) Int. Cl.
| | |
|---|---|
| *B60L 50/60* | (2019.01) |
| *B60L 3/04* | (2006.01) |
| *B60L 1/00* | (2006.01) |
| *B60R 16/03* | (2006.01) |

(52) U.S. Cl.
CPC ................ *B60L 50/60* (2019.02); *B60L 1/00* (2013.01); *B60L 3/04* (2013.01); *B60R 16/03* (2013.01)

(58) Field of Classification Search
CPC .. B60L 50/60; B60L 53/00; B60L 1/00; B60L 3/00–04; B60R 16/03–04; Y02T 10/70; H02J 7/0013; H02J 7/00308; H02J 2310/40; H02J 7/1423; H02J 7/34

USPC ................................ 180/69.6; 307/9.1, 10.1
See application file for complete search history.

(56) References Cited

U.S. PATENT DOCUMENTS

| | | | |
|---|---|---|---|
| 9,520,734 B2 * | 12/2016 | Katou | ................ B60L 3/00 |
| 9,802,562 B2 * | 10/2017 | Yasunori | ............... H02J 7/0063 |
| 2014/0055094 A1 * | 2/2014 | Takagi | .................... B60L 50/51 |
| | | | 320/126 |
| 2017/0080883 A1 * | 3/2017 | Yasunori | ........... H02J 7/007182 |
| 2017/0217313 A1 * | 8/2017 | Hashimoto | ............. B60L 50/16 |

(Continued)

FOREIGN PATENT DOCUMENTS

| | | |
|---|---|---|
| DE | 102015222545 A1 | 5/2017 |
| DE | 10 2018 201 863 A1 | 8/2019 |
| WO | 2017072465 A1 | 5/2017 |

*Primary Examiner* — Rexford N Barnie
*Assistant Examiner* — Swarna N Chowdhuri
(74) *Attorney, Agent, or Firm* — McGlew and Tuttle, P.C.

(57) ABSTRACT

A vehicle onboard power supply system, supplying a consumer with electrical energy, includes a first voltage detection device (55) detecting a voltage level in a line area (51) between an input terminal (34) of a first circuit breaker (26) and a first battery (16), a second voltage detection device (57) detecting the voltage level in a line area (53) between an input terminal (42) of a third circuit breaker (30) and a second battery (18), a third voltage detection device (58) detecting the voltage level in the area of a consumer connection line (12). An overvoltage detection device (62) detects an overvoltage in the area of the consumer connection line based on the voltage level detected by the third voltage detection device and switches the first circuit breaker and the third circuit breaker into open states when overvoltage is detected in the area of the consumer connection line.

13 Claims, 1 Drawing Sheet

(56) References Cited

U.S. PATENT DOCUMENTS

| | | |
|---|---|---|
| 2019/0191550 A1 | 6/2019 | Sasao et al. |
| 2020/0177008 A1* | 6/2020 | Tiedtke .................... B60L 1/00 |
| 2020/0185936 A1* | 6/2020 | Oishi ...................... B60L 53/63 |
| 2021/0242712 A1* | 8/2021 | Izawa ..................... H02J 9/061 |

* cited by examiner

ONBOARD POWER SUPPLY SYSTEM

CROSS REFERENCE TO RELATED APPLICATIONS

This application claims the benefit of priority under 35 U.S.C. § 119 of German Applications 10 2019 120 471.2, filed Jul. 30, 2019 and 10 2019 124 163.4, filed Sep. 10, 2019, the entire contents of which are incorporated herein by reference.

TECHNICAL FIELD

The present invention pertains to an onboard power supply system in a vehicle, in which one or more consumers are supplied with electrical energy redundantly.

TECHNICAL BACKGROUND

In vehicles in which driving functions are performed by control systems provided in the vehicle, i.e., for example, in vehicles built for autonomous driving, it is necessary to have the ability to operate especially safety-relevant consumers, for example, a steering system, a spacing system or a lane keeping system, with a high operational reliability. For example, redundantly operating batteries are used for this purpose, so that such consumers can be supplied from two or at least two batteries. The batteries are connected to and decoupled from the consumers via circuit breaker devices. Such circuit breaker devices are also used especially to prevent damage to the consumers or to some of the consumers by decoupling the consumers or some of the consumers when defects or fault conditions, for example, overvoltage, develop.

SUMMARY

An object of the present invention is to provide an onboard power supply system for supplying at least one consumer with electrical energy in a vehicle as well as a process for operating an onboard power supply system for supplying at least one consumer with electrical energy in a vehicle, with which onboard power supply system and process it is possible to respond to the development of overvoltages in the onboard power supply system reliably and rapidly.

According to a first aspect, this object is accomplished by an onboard power supply system for supplying at least one consumer with electrical energy in a vehicle, comprising:
a first battery,
a second battery, and
a circuit breaker device connecting the first battery and the second battery to one another in parallel to a consumer connection line area,
wherein the circuit breaker device comprises:
a first circuit breaker group between the first battery and the consumer connection line area, wherein the first circuit breaker group comprises a first circuit breaker and, connected in series to it, a second circuit breaker, wherein each circuit breaker of the first circuit breaker and the second circuit breaker has an input terminal and an output terminal and has a line connection between the input terminal and the output terminal in a closed state and acts in an open state as a diode blocking in the direction from the output terminal to the input terminal, wherein the output terminal of the first circuit breaker is connected to the output terminal of the second circuit breaker and wherein the input terminal of the first circuit breaker is connected to the first battery and the input terminal of the second circuit breaker is connected to the consumer connection line area, and
a second circuit breaker group between the second battery and the consumer connection line area, wherein the second circuit breaker group comprises a third circuit breaker and, connected in series to it, a fourth circuit breaker, wherein each circuit breaker of the third circuit breaker and the fourth circuit breaker has an input terminal and an output terminal and has a line connection between the input terminal and the output terminal in the closed state and acts as a diode blocking in the direction from the output terminal to the input terminal in an open state, wherein the output terminal of the third circuit breaker is connected to the output terminal of the fourth circuit breaker and wherein the input terminal of the third circuit breaker is connected to the second battery and the input terminal of the fourth circuit breaker is connected to the consumer connection line area,
wherein the onboard power supply system further comprises:
a first voltage detection device for detecting the voltage level in a line area between the input terminal of the first circuit breaker and the first battery,
a second voltage detection device for detecting the voltage level in a line area between the input terminal of the third circuit breaker and the second battery,
a third voltage detection device for detecting the voltage level in the area of the consumer connection line area, and
an overvoltage detection device for detecting an overvoltage in the area of the consumer connection line area on the basis of the voltage level detected by the third voltage detection device and for switching the first circuit breaker and the third circuit breaker into their respective open states when overvoltage is detected in the area of the consumer connection line area.

An overvoltage state is detected in the onboard power supply system configured according to the present invention by the voltage level being monitored in the line area connecting the different electrical energy consumers, especially also the safety-relevant electrical energy consumers, namely, in the consumer connection line area, and by responding by opening the circuit breakers of the two circuit breaker groups, which circuit breakers are connected to the batteries, when an overvoltage state is detected or recognized. The opening of these two circuit breakers when the second and fourth circuit breakers are still being held in the closed state does not at first decouple the consumers from the batteries, because the first circuit breaker and the third circuit breaker still continue to allow a flow of current from the batteries in the direction of the consumer connection line area based on their diode function. However, the two batteries or the line areas located between the batteries and the respective circuit breakers connected thereto are decoupled by this diode function, so that in each of these line areas, the voltage level present there can be checked for the presence of a defect, especially an overvoltage state, unaffected by the voltage level prevailing in the respective other line area. The line area that then shows an overvoltage when comparing the voltage level prevailing there with a reference voltage level can then be decoupled from the consumer connection line area by opening the associated second or fourth circuit breaker, so that this consumer connection line area or the consumer connected thereto can continue to be supplied via the battery operating correctly and without overvoltage.

In order to make it possible to carry out the operation of detecting an overvoltage in the consumer connection line area as rapidly as possible, it is proposed that the overvoltage detection device be configured as an electrical circuit for comparing the voltage level detected by the third voltage detection device with a first reference voltage level and for generating a circuit breaker switching signal switching the first circuit breaker and the third circuit breaker into their open states when the voltage level in the consumer connection line area is above the first reference voltage level. The configuration of the overvoltage detection device as an electrical circuit, i.e., as a circuit configured exclusively as hardware and operating without any control programs, which compares voltage levels to one another and generates switching signals in response to the comparison, leads to a very rapid response, which takes place more rapidly by several orders of magnitude compared to the generation of such switching signals in a microprocessor device programmed with control programs.

In order to make it possible to open and close the circuit breakers of the circuit breaker device for the normal switching operation of the circuit breaker device, a circuit breaker actuating unit may be provided, wherein the circuit breaker actuating unit is configured to switch each of the circuit breakers between its open state and its closed state, and wherein the circuit breaker actuating unit is configured to compare the voltage level detected by the first voltage detection device and the voltage level detected by the second voltage detection device with a second reference voltage level.

Such a circuit breaker actuating unit may comprise a microprocessor device generating switching commands for the circuit breakers. The switching commands for the circuit breaker device can thus be generated in the microprocessor device on the basis of control programs stored in this microprocessor device.

In order to make it possible to take the necessary actions for checking the voltage level in the area of the two batteries by means of the circuit breaker actuating unit when an overvoltage develops in the consumer connection line area, it is proposed that the overvoltage detection device be configured to output an overvoltage signal to the circuit breaker actuating unit when overvoltage is detected in the consumer connection line area, wherein the circuit breaker actuating unit is configured to compare the voltage level detected by the first voltage detection device and the voltage level detected by the second voltage detection device with the second reference voltage level when the overvoltage signal is received, and to switch the second circuit breaker into its open state when the voltage level detected by the first voltage detection device is above the second reference voltage level, and to switch the fourth circuit breaker into its open state when the voltage level detected by the second voltage detection device is above the second reference voltage level.

In order to ensure now the voltage supply via the respective, correctly operating circuit breaker group, the circuit breaker actuating unit may be configured to switch the third circuit breaker into its closed state when the second circuit breaker is switched into its open state, and to switch the first circuit breaker into its closed state when the fourth circuit breaker is switched into its open state.

In the onboard power supply system according to the present invention, each circuit breaker may comprise at least one MOSFET switch, wherein the input terminal is provided in each circuit breaker by the source terminal of the at least one MOSFET switch and the output terminal is provided by the drain terminal of the at least one MOSFET switch.

According to another aspect, the object described in the introduction is accomplished by a process for operating an onboard power supply system for supplying at least one consumer with electrical energy in a vehicle, the onboard power supply system comprising:

a first battery,
a second battery,
a circuit breaker device connecting the first battery and the second battery in parallel to one another to a consumer connection line area,
wherein the circuit breaker device comprises:
a first circuit breaker group between the first battery and the consumer connection line area, wherein the first circuit breaker group comprises a first circuit breaker and, connected in series to it, a second circuit breaker, wherein each circuit breaker of the first circuit breaker and the second circuit breaker has an input terminal and an output terminal and has a line connection between the input terminal and the output terminal in a closed state and acts as a diode blocking in the direction from the output terminal to the input terminal in an open state, wherein the output terminal of the first circuit breaker is connected to the output terminal of the second circuit breaker and wherein the input terminal of the first circuit breaker is connected to the first battery and the input terminal of the second circuit breaker is connected to the consumer connection line area,
a second circuit breaker group between the second battery and the consumer connection line area, wherein the second circuit breaker group comprises a third circuit breaker and, connected in series to it, a fourth circuit breaker, wherein each circuit breaker of the third circuit breaker and the fourth circuit breaker has an input terminal and an output terminal and has a line connection between the input terminal and the output terminal in a closed state and acts as a diode blocking in the direction from the output terminal to the input terminal in an open state, wherein the output terminal of the third circuit breaker is connected to the output terminal of the fourth circuit breaker, and wherein the input terminal of the third circuit breaker is connected to the second battery and the input terminal of the fourth circuit breaker is connected to the consumer connection line area,
wherein the onboard power supply system further comprises:
a first voltage detection device for detecting the voltage level in a line area between the input terminal of the first circuit breaker and the first battery,
a second voltage detection device for detecting the voltage level in a line area between the input terminal of the second circuit breaker and the second battery, and
a third voltage detection device for detecting the voltage level in the area of the consumer connection line area, especially of an onboard power supply system in accordance with one of the above claims, comprising the steps:
a) Comparison of the voltage level detected by the third voltage detection device with a first reference voltage level and
b) then, if the voltage level detected by the third voltage detection device is above the first reference voltage level, switching of the first circuit breaker and of the third circuit breaker into their open states.

In order to make it possible, after detecting that an overvoltage is present in the area of the consumer connection line area, to determine in which area and especially in connection with which of the batteries such an overvoltage state has developed, provisions may furthermore be made for comparing the voltage level detected by the first voltage detection device and the voltage level detected by the second voltage detection device, after switching the first circuit breaker and the third circuit breaker into their open states in step c), with a second reference voltage level, and for then switching the second circuit breaker into its open state in a step d) when the voltage level detected by the first voltage detection device is above the second reference voltage level, and for then switching the fourth circuit breaker into its open state when the voltage level detected by the second voltage detection device is above the second reference voltage level.

Further, the third circuit breaker can then be switched in step d) into its closed state when the second circuit breaker is witched into its open state and then, when the fourth circuit breaker is switched into its open state, the first circuit breaker can be switched into its closed state.

The second reference voltage level may correspond here to the first reference voltage level.

In order to make it possible to carry out especially the first detection of an overvoltage state in the consumer connection line area without a substantial time delay and to be able then to open the circuit breakers connected to the batteries in response thereto, it is proposed that steps a) and b) be carried out by an overvoltage detection device configured as an electrical circuit. The subsequent steps, namely the checking of the line areas between the batteries and the circuit breakers connected to these and the decisions to be made in response to this checking, i.e., steps c) and d), can then be carried out by a circuit breaker actuating unit comprising a microprocessor device.

The present invention will be described below in detail with reference to the attached FIGURE. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
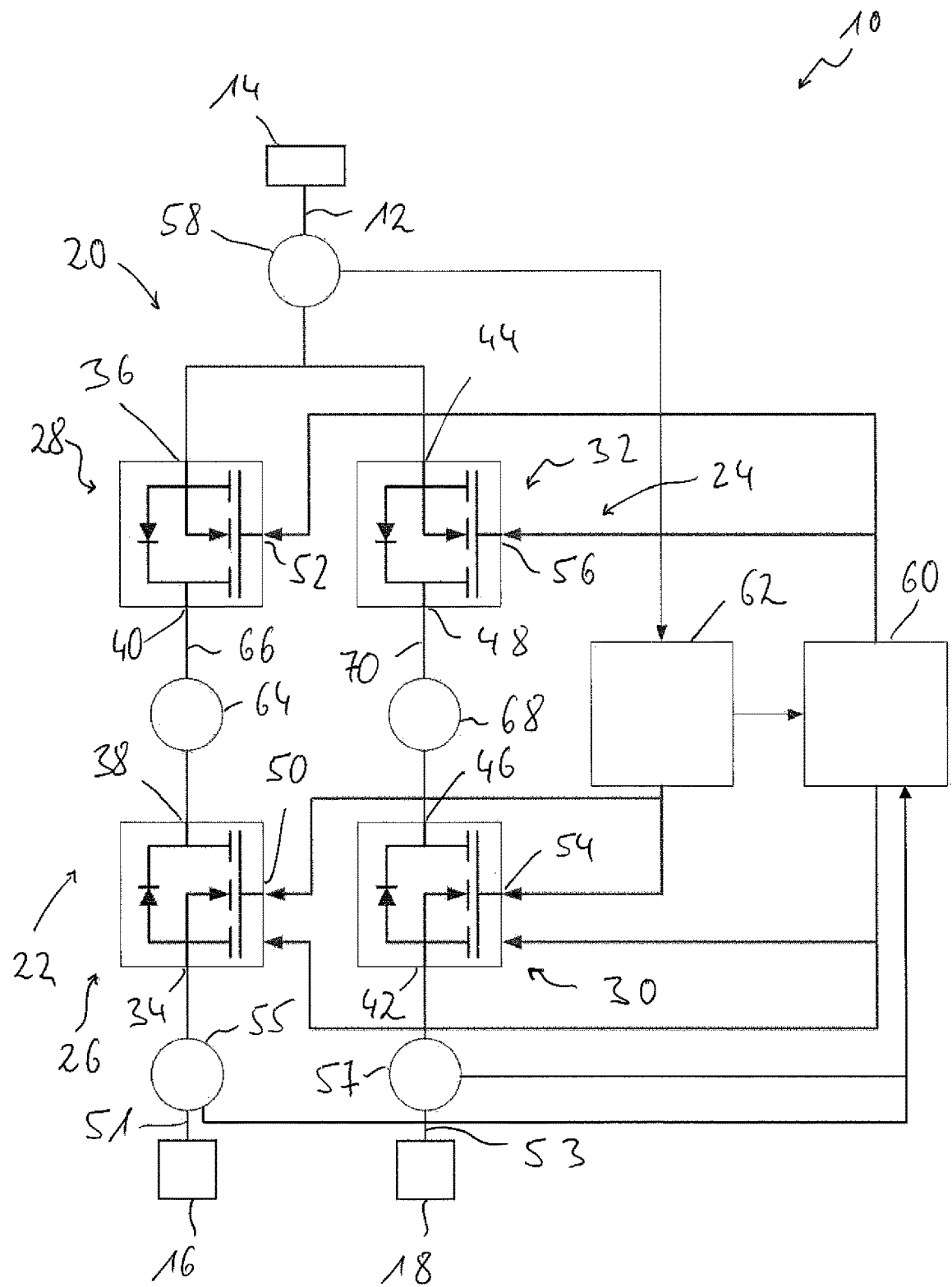
FIG. 1 is a schematic view of an onboard power supply system for a vehicle.

Referring to the drawings, an onboard power supply system for a vehicle is generally designated by 10 in FIG. 1. One or more consumers 14 connected to a consumer connection line area 12 are supplied with electrical energy from two batteries 16, 18 in the onboard power supply system 10.

In order to make it possible to connect the batteries 16, 18 to the consumer or consumers 14 and to the consumer connection area 12 and to decouple them from same, a circuit breaker device generally designated by 20 is provided. The circuit breaker device 20 comprises a respective circuit breaker group 22, 24, in association with each of the two batteries 16, 18 supplying the consumer or consumers 14, for example, in parallel.

The first circuit breaker group 22 associated with the first battery 16 comprises a first circuit breaker 26 and, connected in series to it, a second circuit breaker 28. The second circuit breaker group 24 provided in association with the second battery 18 likewise comprises a third circuit breaker 30 and, arranged in series to it, a fourth circuit breaker 32.

Each of these circuit breakers 26, 28, 30, 32 preferably comprises at least one MOSFET switch, especially a normally blocking n-channel MOSFET switch. It should be noted that one or more of these circuit breakers 26, 28, 30, 32 may also comprise a plurality of MOSFET switches operating in parallel with one another.

The first circuit breaker 26 has an input terminal 34 connected to the battery 16. The second circuit breaker 28 likewise has an input terminal 36 connected to the consumer connection line area 12. An output terminal 38 of the first circuit breaker 26 is connected to an output terminal 40 of the second circuit breaker 28.

An input terminal 42 of the third circuit breaker 30 is connected to the second battery 18. An input terminal 44 of the fourth circuit breaker 32 is connected to the consumer connection line area 12 and hence also to the input area 36 of the second circuit breaker 28. An output terminal 46 of the third circuit breaker 30 is connected to an output terminal 48 of the fourth circuit breaker 32.

Especially if the circuit breakers 26, 28, 30, 32 are configured as MOSFET switches, the input terminals 34, 36, 42, 44 thereof may be provided each by the source terminal, while the output terminals 38, 40, 46, 48 may be provided each by the drain terminals. Further, each of these circuit breakers 26, 28, 30, 32 has in this case an actuating terminal 50, 52, 54, 56, which is provided by a respective gate terminal and to which a circuit breaker switching signal, i.e., a respective gate voltage, can be applied in the manner described below to switch the circuit breakers 26, 28, 30, 32 between a basically non-conducting open state and a closed state in which there is conduction in both directions. As is illustrated in FIG. 1, each of the circuit breakers 26, 28, 30, 32 acts as a diode in its open state, and the circuit breakers 26, 28 of the first circuit breaker group 22, which are each associated with one another in pairs, as well as the circuit breakers 30, 32 of the second circuit breaker group 24, which are associated with one another in pairs, are switched opposite to one another in respect to this diode function by connecting their respective output terminals 38, 40 as well as 46, 48, i.e., their respective drain terminals to one another. The consequence of this is that, for example, when the circuit breakers 26, 28 are maintained in the open state in the first circuit breaker group 22, the first circuit breaker 26 would basically allow a flow of current in the open state from the first battery 16 to the consumer connection line area 12 and hence to the consumer or consumers 14 based on its diode function, while the second circuit breaker 28 connected in the opposite sense in respect to its diode function has a blocking action in this state and therefore decouples the consumer connection line area 12 from the first battery 16. If only the second circuit breaker 28 is switched into its closed state, the consumer connection line area 12 is coupled to the first battery 16 based on the diode function of the first circuit breaker 26, so that the consumer or consumers 14 can be supplied with electrical energy from the first battery 16. A corresponding functionality is also present in the area of the second battery 18 or of the second circuit breaker group 24 associated with this battery. This means that each of the circuit breakers 26, 28, 30, 32 has a blocking action in the open state from its respective output terminal 38, 40, 46, 48 to the respective input terminal 34, 36, 42, 44, i.e., it does not allow a current flow in this direction, but it is conductive in the other direction based on the diode function.

A first voltage detection device 55 is provided in association with the first battery 16 in a line area 51 between the first battery 16 and the first circuit breaker 26. A second voltage detection device 57 is likewise provided in association with the second battery 18 in a line area 53 between the second battery 18 and the third circuit breaker 30. A third voltage detection device 58 is provided in association with the consumer connection line area 12, i.e., between the input terminals 36, 44 of the second circuit breaker 28 and of the fourth circuit breaker 32 and the consumer or consumers 14. Each of these voltage detection devices 52, 56, 58 is configured to detect the voltage level or the potential in the respective line area 51, 53, 12, for example, in relation to a ground potential, and to output a voltage signal representing this voltage level. The first voltage detection device 55 and the second voltage detection device 57 output the respective voltage signal generated in them to a circuit breaker actuating unit 60. The third voltage detection device 58 outputs the voltage signal generated in it to an overvoltage detection device 62.

The circuit breaker actuating unit 60 comprises one or more microprocessors and is programmed with control programs, which actuate all circuit breakers 26, 28, 30, 32, taking different input signals into consideration. These input signals may also comprise, for example, current signals, which represent the current flowing through a first current detection device 64 in a line area 66 between the first circuit breaker 26 and the second circuit breaker 28 or the electrical current between the third circuit breaker 30 and the fourth circuit breaker 32, which is detected by a second current detection device 68 in a line area 70. It can consequently be ensured by the circuit breaker actuating unit 60 during the normal operation of a vehicle that the consumer or consumers 14 are supplied in a suitable manner from at least one of the two batteries 16, 18 and that a flow of current from one of the two batteries to the other one is prevented. A mutual charging of the batteries shall be avoided. Each of the batteries can be supplied and charged by one or more generators provided in a vehicle.

The overvoltage detection device 62 is configured as an electrical circuit, i.e., it has no microprocessor running one or more control programs. The voltage signal fed into the overvoltage detection device 62 by the third voltage detection device 58 is compared with a first reference voltage level in the overvoltage detection device 62. If the voltage level represented by this voltage signal and detected by the third voltage detection device 58 in the consumer connection line area 12 or in the area of the input terminals 36, 44 of the second circuit breaker 28 or of the fourth circuit breaker 32 is below the first reference voltage level, it can be assumed that the system is operating correctly and the consumer or consumers 14 can be supplied in the generally intended manner from at least one of the two batteries 16, 18.

If the voltage level detected by the third voltage detection device 58 is above the first reference voltage level, this means that an overvoltage, which may lead to damage to the consumer or consumers 14 at least if it is present at said consumer or consumers over a prolonged time, is present in the area of the consumer connection line area 12. The overvoltage detection device 62 generates in this case circuit breaker switching signals for the first circuit breaker 26 and for the third circuit breaker 30, so that these are switched into their open states. If the circuit breakers, especially the first circuit breaker 26 and the third circuit breaker 30, are configured as normally blocking MOSFET switches, the application of the gate voltage to these circuit breakers 26, 30 is prevented or ended by the circuit breaker switching signal, so that these are switched into their open states if they were in the closed state before. At the same time, the voltage detection device 62 outputs an overvoltage signal into the circuit breaker actuating unit 60, so that information indicating that an overvoltage is present in the consumer connection line area 12 is present in this circuit breaker actuating unit 60 as well.

The switching of the first circuit breaker 26 and of the third circuit breaker 30 into their respective open states causes the two line areas 51, 53 to become decoupled from one another in terms of voltage, because while the second circuit breaker 28 and the fourth circuit breaker 32 are at first still maintained in the closed state, the first circuit breaker 26 and the third circuit breaker 30 are connected in opposite directions in terms of their respective diode functions. Unaffected by the voltage level prevailing in the respective other line area, the voltage level prevailing in each of the two line areas, i.e., for example, the potential present relative to the ground potential, can then be detected in each of the two line areas 51, 53 by the respective associated voltage detection device 55 and 57 and analyzed in the circuit breaker actuating unit 60.

Consequently, if the two circuit breakers 26, 30 are switched into their open states, which means that the consumer or consumers 14 can continue to be supplied by the batteries 16,18 based on their diode function, the circuit breaker actuating unit 60 compares the voltage signals sent by the two voltage detection devices 55, 57 with a second reference voltage level, which may correspond, for example, to the first reference voltage level provided in the overvoltage detection device 62. If the presence of an overvoltage is detected in the area of one of the two line areas 51, 53, which is shown by the fact that the voltage level prevailing in such a line area 51 or 53 is above the second reference voltage level, this indicates that an effect leading to the overvoltage is present in connection with this line area or the respective battery connected in that case. In response to this, the circuit breaker actuating unit 60 actuates the second circuit breaker 28 or the fourth circuit breaker 32, which is associated with this line area and is still being held at first in the closed state, such that this is switched over into its open state, which can again be brought about, for example, by ending the application of the gate voltage to this circuit breaker. The battery 16 or 18 or the line area 51 or 53 in which the development of an overvoltage was detected is thus decoupled from the consumer connection line area 12. The consumer or consumers 14 can then continue to be supplied with electrical energy by the respective other battery. At the same time, the third circuit breaker 30 can be switched into its closed state when the second circuit breaker 28 is switched into its open state. If the fourth circuit breaker 32 is switched into its open state based on a detected overvoltage, the first circuit breaker 26 can be switched into its closed state as an accompanying step.

Since a state in which the area in which the overvoltage has indeed developed can be localized very rapidly by means of the circuit breaker actuating unit 60 in the onboard power supply configured according to the present invention by detecting an overvoltage in the consumer connection line area 12 by means of the overvoltage detection device configured as an electrical circuit based on the very short response time, a very short response time of less than 50 ?sec is guaranteed, with which the supply branch in which this problem has developed can be decoupled after the detection of the presence of an overvoltage. Since this response time is very short, there is no risk of damage to the consumer or consumers even during this time of continued supply of said consumer or consumers 14.

At the same time, a warning, by which it can be detected in a vehicle that such a fault condition is present can be generated with the decoupling of the incorrectly operating supply branch. Further safety measures can then be taken in order to guarantee that this fault condition is ended or, for example, a vehicle can be safely brought to a stop.

It should finally be pointed out that the principles of the present invention can also be applied when more than two batteries are used in parallel to one another to supply consumers. Such a group of circuit breakers, which circuit breakers can be operated and analyzed as well as switched as described above, can then be provided in each of these supply branches.

While specific embodiments of the invention have been shown and described in detail to illustrate the application of the principles of the invention, it will be understood that the invention may be embodied otherwise without departing from such principles.

What is claimed is:

1. A vehicle onboard power supply system for supplying at least one consumer with electrical energy in a vehicle, the onboard power supply comprising:
    a first battery;
    a second battery;
    a circuit breaker device connecting the first battery and the second battery in parallel to one another to a consumer connection line area, the circuit breaker device comprising:
        a first circuit breaker group between the first battery and the consumer connection line area, wherein the first circuit breaker group comprises a first circuit breaker and a second circuit breaker connected in series to the first circuit breaker, wherein each of the first circuit breaker and the second circuit breaker has an input terminal and an output terminal and has a line connection between the input terminal and the output terminal in a closed state and acts as a diode blocking a direction from the output terminal to the input terminal in an open state, wherein the output terminal of the first circuit breaker is connected to the output terminal of the second circuit breaker and wherein the input terminal of the first circuit breaker is connected to the first battery and the input terminal of the second circuit breaker is connected to the consumer connection line area; and
        a second circuit breaker group between the second battery and the consumer connection line area, wherein the second circuit breaker group comprises a third circuit breaker and a fourth circuit breaker connected in series to the third circuit breaker, wherein each of the third circuit breaker and fourth circuit breaker has an input terminal and an output terminal and has a line connection between the input terminal and the output terminal in a closed state and acts as a diode blocking in a direction from the output terminal to the input terminal in an open state, wherein the output terminal of the third circuit breaker is connected to the output terminal of the fourth circuit breaker and wherein the input terminal of the third circuit breaker is connected to the second battery and the input terminal of the fourth circuit breaker is connected to the consumer connection line area;
    a first voltage detection device configured to detect a voltage level in a line area between the input terminal of the first circuit breaker and the first battery,
    a second voltage detection device configured to detect a voltage level in a line area between the input terminal of the third circuit breaker and the second battery,
    a third voltage detection device configured to detect a voltage level in an area of the consumer connection line area; and
    an overvoltage detection device configured to detect an overvoltage in the area of the consumer connection line area based on the voltage level detected by the third voltage detection device and configured to switch the first circuit breaker and the third circuit breaker into open states when overvoltage is detected in the area of the consumer connection line area.

2. A vehicle onboard power supply system in accordance with claim 1, wherein the overvoltage detection device is configured as an electrical circuit for comparing the voltage level detected by the third voltage detection device with a first reference voltage level and for generating a circuit breaker switching signal switching the first circuit breaker and the third circuit breaker into the open states in case of a voltage level above the first reference voltage level in the consumer connection line area.

3. A vehicle onboard power supply system in accordance with claim 1, further comprising a circuit breaker actuating unit configured to switch each of the circuit breakers between the open state and the closed state, and configured to compare the voltage level detected by the first voltage detection device and by the second voltage detection device with a second reference voltage level.

4. A vehicle onboard power supply system in accordance with claim 3, wherein the circuit breaker actuating unit comprises a microprocessor device generating switching commands for the circuit breakers.

5. A vehicle onboard power supply system in accordance with claim 2, further comprising a circuit breaker actuating unit configured to switch each of the circuit breakers between the open state and the closed state, and configured to compare the voltage level detected by the first voltage detection device and by the second voltage detection device with a second reference voltage level, wherein:
    the overvoltage detection device is configured to output an overvoltage signal to the circuit breaker actuating unit when overvoltage is detected in the consumer connection line area;
    the circuit breaker actuating unit is configured to compare the voltage level detected by the first voltage detection device and the voltage level detected by the second voltage detection device with the second reference voltage level upon receipt of the overvoltage signal, and to switch the second circuit breaker into the open state when the voltage level detected by the first voltage detection device is above the second reference voltage level, and to switch the fourth circuit breaker into the open state when the voltage level detected by the second voltage detection device is above the second reference voltage level.

6. A vehicle onboard power supply system in accordance with claim 5, wherein the circuit breaker actuating device is configured to switch the third circuit breaker into the closed state when the second circuit breaker is switched into the open state, and to switch the first circuit breaker into the closed state when the fourth circuit breaker is switched into its open state.

7. A vehicle onboard power supply system in accordance with claim 1, wherein:
   each circuit breaker comprises at least one MOSFET switch; and
   the input terminal is provided in each circuit breaker by a source terminal of the at least one MOSFET switch and the output terminal is provided by the drain terminal of the at least one MOSFET switch.

8. A process for operating an onboard power supply system for supplying at least one consumer with electrical energy in a vehicle, said onboard power supply system comprising:
   a first battery;
   a second battery;
   a circuit breaker device connecting the first battery and the second battery in parallel to one another to a consumer connection line area, wherein the circuit breaker device comprises:
      a first circuit breaker group between the first battery and the consumer connection line area, wherein the first circuit breaker group comprises a first circuit breaker and a second circuit breaker connected in series to the first circuit breaker, wherein each of the first circuit breaker and second circuit breaker has an input terminal and an output terminal and has a line connection between the input terminal and the output terminal in a closed state and acts as a diode blocking in a direction from the output terminal to the input terminal in an open state, wherein the output terminal of the first circuit breaker is connected to the output terminal of the second circuit breaker, and wherein the input terminal of the first circuit breaker is connected to the first battery and the input terminal of the second circuit breaker is connected to the consumer connection line area; and
      a second circuit breaker group between the second battery and the consumer connection line area, wherein the second circuit breaker group comprises a third circuit breaker and a fourth circuit breaker connected in series to the third circuit breaker, wherein each of the third circuit breaker and fourth circuit breaker has an input terminal and an output terminal and has a line connection between the input terminal and the output terminal in a closed state and acts as a diode blocking in a direction from the output terminal to the input terminal in an open state, wherein the output terminal of the third circuit breaker is connected to the output terminal of the fourth circuit breaker, and wherein the input terminal of the third circuit breaker is connected to the second battery and the input terminal of the fourth circuit breaker is connected to the consumer connection line area;
   a first voltage detection device configured to detecting a voltage level in a line area between the input terminal of the first circuit breaker and the first battery;
   a second voltage detection device configured to detect a voltage level in a line area between the input terminal of the third circuit breaker and the second battery; and
   a third voltage detection device configured to detect a voltage level in the area of the consumer connection line area, the process comprising the steps of:
   comparing the voltage level detected by the third voltage detection device with a first reference voltage level; and
   if the voltage level detected by the third voltage detection device is above the first reference voltage level, switching the first circuit breaker and the third circuit breaker into open states.

9. A process in accordance with claim 8, wherein after switching the first circuit breaker and the third circuit breaker into open states, the voltage level detected by the first voltage detection device and the voltage level detected by the second voltage detection device are compared to a second reference voltage level and if the voltage level detected by the first voltage detection device is above the second reference voltage level, the second circuit breaker is switched into the open state, and if the voltage level detected by the second voltage detection device is above the second reference voltage level, the fourth circuit breaker is switched into the open state.

10. A process in accordance with claim 9, wherein if the second circuit breaker is switched into the open state, the third circuit breaker is switched into the closed state in the step of switching the second circuit breaker into the open state and if the fourth circuit breaker is switched into the open state, the first circuit breaker is switched into the closed state.

11. A process in accordance with claim 9, wherein the second reference voltage level corresponds to the first reference voltage level.

12. A process in accordance with claim 8, wherein the steps of comparing the voltage level detected by the third voltage detection device with a first reference voltage level and switching the first circuit breaker and the third circuit breaker into open states are carried out by an overvoltage detection device configured as an electrical circuit.

13. A process in accordance with claim 9, wherein the switching of the first circuit breaker and the third circuit breaker into open states and the switching of the second circuit breaker into the open state if the voltage level detected by the first voltage detection device is above the second reference voltage level with the comparing of the voltage detected by first voltage detection device and the voltage level detected by the second voltage detection device, are carried out by a circuit breaker actuating unit comprising a microprocessor device.

* * * * *